UNITED STATES PATENT OFFICE.

QUINTIN MARINO, OF LONDON, ENGLAND.

PLATING ELECTROLYTE AND PROCESS OF MAKING SAME.

1,404,156.   Specification of Letters Patent.   Patented Jan. 17, 1922.

No Drawing.   Application filed November 15, 1921. Serial No. 515,373.

*To all whom it may concern:*

Be it known that I, QUINTIN MARINO, of 6 Arkwright Road, Hampstead, London, England, a subject of the King of Italy, have invented certain new and useful Improvements in Plating Electrolyte and Processes of Making Same (for which I filed application in Great Britain Aug. 25, 1920), of which the following is a specification.

It is well known that heretofore it has been found impossible to deposit nickel or cobalt from a cyanide solution upon a metallic surface, and the object of my invention is to enable these metals as well as alloys of these metals with silver or tin so to be deposited.

My invention is based on the fact that I have ascertained that by the addition of a boro-tartrate of sodium or potassium and a formate of sodium, potassium, or ammonium to a cyanide solution of either cobalt or nickel, it is possible to deposit these metals and the alloys above referred to in an entirely satisfactory manner.

According to my invention I employ an electrolyte which is preferably prepared in the following manner:

I first dissolve in 1 quart of water about 8 ozs. avoirdupois of a salt of cobalt or nickel (e. g. nitrate, sulphate, acetate, or other soluble salt), and add ammonia hydroxid in amount sufficient to neutralize any acidity of the solution, after which I make a separate solution in 1 quart of water of about 4 ozs. of boro-tartrate of sodium or potassium, and a third solution of 1 oz. of formate of sodium, potassium or ammonium in 1 pint of water. I then mix these three solutions together and finally dissolve the resulting precipitate with potassium cyanide (about 8 ozs.) which must not be in excess. If I desire to deposit an alloy I make a similar solution of silver or tin before dissolving the precipitate i. e. by dissolving in 1 quart of water about 8 ozs. of a soluble salt of silver or tin, such as silver nitrate or tin protochloride and mix the two solutions together, and as before dissolve the resulting precipitate with potassium cyanide. The quality of soluble salt of silver or tin will depend upon the percentage of silver or tin required in the alloy, and this quantity can readily be calculated from the silver or tin content of the soluble salt.

The electrolyte I have found to be very conductive and readily dissociated. With a current of from five to ten amperes per square foot of surface and a voltage of from one to five volts, a very homogeneous coating may be deposited. In the appended claims, where I have referred to nickel, I desire to be understood as including therein its closely similar analogue cobalt, and where I refer to silver, I desire to be understood as also covering tin, which for the purpose of the present invention is very similar thereto.

I claim:

1. A process of making an electrolyte which comprises adding ammonia to a solution of a nickel salt, and mixing therewith a solution of a borotartrate of an alkali and a solution of a formate of an alkali, whereby a precipitate is formed, and dissolving said precipitate in a solution of a cyanide of an alkali, without any substantial excess of the latter.

2. A process of making a plating electrolyte which comprises adding ammonia to a solution of a nickel salt, mixing therewith a solution of a borotartrate of an alkali, and a solution of a formate of an alkali and a solution of a silver salt, whereby a precipitate is formed, and dissolving said precipitate in a solution of an alkali metal cyanide, while avoiding any large excess of the latter.

3. An electrolyte comprising an alkali cyanid solution of the insoluble reaction product of a nickel salt, ammonia, an alkali borotartrate and an alkali formate, such solution being free from any substantial excess of alkali cyanide.

4. An electrolyte comprising an alkali cyanid solution of the insoluble reaction product of a nickel salt, a silver salt, ammonia, an alkali borotartrate, and an alkali formate, such solution being free from any substantial excess of alkali cyanide.

QUINTIN MARINO.